United States Patent
Sasaki

(10) Patent No.: US 8,478,562 B2
(45) Date of Patent: Jul. 2, 2013

(54) MEASURING INSTRUMENT

(75) Inventor: Koji Sasaki, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 514 days.

(21) Appl. No.: 12/588,397

(22) Filed: Oct. 14, 2009

(65) Prior Publication Data
US 2010/0100353 A1    Apr. 22, 2010

(30) Foreign Application Priority Data

Oct. 21, 2008 (JP) ................................ 2008-271289

(51) Int. Cl.
*G01B 5/14* (2006.01)

(52) U.S. Cl.
USPC ............... 702/158; 702/33; 702/94; 702/163

(58) Field of Classification Search
USPC ................ 702/33, 36, 94, 95, 150, 163, 166, 702/158
See application file for complete search history.

(56) References Cited

U.S. PATENT DOCUMENTS 3,768,094 A * 10/1973 Henrich ........................... 341/15
5,828,584 A * 10/1998 Oda et al. ....................... 702/158
6,412,187 B1 * 7/2002 Sasaki et al. ..................... 33/784

FOREIGN PATENT DOCUMENTS

| CN | 1261660 A | 8/2000 |
|----|-----------|--------|
| CN | 101201247 A | 6/2008 |
| JP | U-2-45762 | 3/1990 |

OTHER PUBLICATIONS

Jul. 25, 2012 Office Action issued in Chinese Application No. 200910180798.1 (with English translation).

\* cited by examiner

*Primary Examiner* — Eliseo Ramos Feliciano
*Assistant Examiner* — Paul D Lee
(74) *Attorney, Agent, or Firm* — Oliff & Berridge, PLC

(57) ABSTRACT

A measuring instrument includes a main body, a stylus configured to be movable in relation to the main body, an encoder for detecting the amount of displacement of the stylus relative to the main body, a calculating section for calculating a measurement value from the amount of displacement detected by the encoder, a display section for displaying the measurement value calculated by the calculating section, an operation section for issuing a command to the calculating section, and a storage section that stores an effective measurement range larger than a lower limit and smaller than an upper limit of the movement stroke of the stylus. The calculating section makes a determination as to whether or not the amount of displacement detected by the encoder falls within the effective measurement range stored in the storage section and displays the result of such a determination on the display section.

14 Claims, 7 Drawing Sheets

MEASURING INSTRUMENT

BACKGROUND

The present invention relates to a measuring instrument that measures the amount of displacement of a movable member relative to a fixed member.

A vernier caliper, a micrometer, an indicator, a test indicator, a height gauge and the like are known as digital measuring instruments that measure the dimensions of an object to be measured. For example, a test indicator described in Japanese Examined Utility Model Registration Application Publication No. 2-45762 is known.

This type of measuring instrument includes a fixed member, a movable member configured to be movable in relation to the fixed member, detecting means for detecting the amount of displacement of the movable member relative to the fixed member, and a display section for displaying the amount of displacement of the movable member relative to the fixed member, which is detected by the detecting means.

As shown in FIG. 9, an effective measurement range $\beta$ narrower than the movement stroke $\alpha$ of the movable member, namely, the effective measurement range $\beta$ (range starting at A and ending at B) whose values are larger than the lower limit C and smaller than the upper limit D of the movement stroke $\alpha$ of the movable member undergoes accuracy inspection by the manufacturer, and so accuracy of only measurements within the effective range $\beta$ are guaranteed.

For this reason, after a measuring instrument is set with respect to an object to be measured, the movable member is caused to move in relation to the object while measurement is made, in order to ensure that measurement is normally made within the effective measurement range $\beta$. Alternatively, a reference gauge and the object are respectively measured, thereby determining the difference between the object and the reference gauge, namely, a comparison measurement is performed.

However, a test indicator described in Japanese Examined Utility Model Registration Application Publication No. 2-45762 has a disadvantage in that the starting point A and the ending point B of the effective measurement range $\beta$ are not definitely defined in relation to the lower limit C and the upper limit D of the movement stroke $\alpha$ of the movable member. For this reason, when measurement is made, the effective measurement range is narrowed to maintain accuracy, thereby preventing measurement uncertainty.

This makes setting work burdensome, which may cause measurements to be carelessly made outside the effective measurement range, leading to degraded measurement reliability.

SUMMARY

Accordingly, one object of the present invention is to provide a measuring instrument that can improve convenience in setting an instrument as well as maximize an effective measurement range without degrading reliability of measurement values.

The measuring instrument according to some aspects of the present invention includes a fixed member, a movable member configured to be movable in relation to the fixed member, detecting means for detecting an amount of displacement of the movable member relative to the fixed member, a calculating section for calculating a measurement value from the amount of displacement detected by the detecting means, a display section for displaying the measurement value calculated by the calculating section, and an operation section for issuing a command to the calculating section, wherein a storage section is provided which stores an effective measurement range larger than the lower limit and smaller than the upper limit of the movement stroke of the movable member, and the calculating section makes a determination as to whether or not the amount of displacement detected by the detecting means falls within the effective measurement range stored in the storage section and displays the result of such a determination on the display section.

With this arrangement, the movable member is caused to move in relation to an object to be measured while measurement is made, thereby allowing the detecting means to detect the amount of displacement of the movable member relative to the fixed member which is then displayed as a measurement value on the display section. At this time, the calculating section makes a determination as to whether or not the amount of displacement detected by the detecting means falls within the effective measurement range stored in the storage section and displays the result of the determination on the display section.

Displaying the determination as to whether or not measurement is made within the effective measurement range of the movable member helps maintain the reliability of the measurement value. In addition, there is no need for narrowing the effective measurement range to maintain measurement accuracy in setting of the measuring instrument to the object to be measured, as is always the case with the conventional measuring instrument, leading to enhanced convenience as well as achieving the maximization of the effective measurement range.

In the measuring instrument according to one embodiment, it is preferable that the calculating section displays on the display section the measurement value and the starting point and the ending point of the effective measurement range stored in the storage section.

With this arrangement, the display section can not only display the result of a determination as to whether or not the amount of displacement detected by the detecting means falls within the effective measurement range, but also the starting point and the ending point of the effective measurement range stored in the storage section, helping identify a region within the effective measurement range where measurement values are distributed.

In the measuring instrument according to one embodiment, it is preferable that the storage section stores the lower limit and the upper limit of the movement stroke of the movable member, and that the calculating section displays on the display section the measurement value, the starting point and the ending point of the effective measurement range stored in the storage section, and the lower limit and the upper limit of the movement stroke of the movable member.

With this arrangement, the display section further displays the lower limit and the upper limit of the movement stroke of the movable member, thereby identifying how far measurement values are from the lower limit and the upper limit of the movement stroke of the movable member.

In the measuring instrument according to one embodiment, it is preferable that in the effective measurement range setting mode the calculating section performs starting point storing processing for causing the storage section to store as the starting point of the effective measurement range the amount of displacement detected by the detecting means when a command for starting point storing processing is issued by the operation section as well as performs ending point storing processing for causing the storage section to store as the ending point of the effective measurement range the amount of displacement detected by the detecting means when a command for ending point storing processing is issued by the operation section.

With this arrangement, in the effective measurement range setting mode, when a command for starting point storing processing is issued by the operation section after the movable member is caused to move to a position larger than the lower limit of the movement stroke, the amount of displacement (position of the movable member) detected by the detecting means is stored in the storage section as the starting point of the effective measurement range. Then, when a command for ending point storing processing is issued by the operation section after the movable member is caused to move to a position smaller than the upper limit of the movement stroke, the amount of displacement (position of the movable member) detected by the detecting means is stored in the storage section as the ending point of the effective measurement range.

Accordingly, after the movable member is caused to move to a desired position or, for example, the starting point and the ending point of the effective measurement range are guaranteed through the accuracy inspection, just issuing a command for starting point storing processing or ending point storing processing through the operation section allows the storage section to store the starting point and the ending point of the effective measurement range. In other words, just performing the same operation as the usual measurement operation allows the starting point and the ending point of the effective measurement range to be stored.

In the measuring instrument according to one embodiment, it is preferable that the storage section has an effective measurement range corresponding to the movement stroke of the movable member stored therein in advance, and in the effective measurement range setting mode the calculating section performs (i) movement stroke lower limit storing processing for causing the storage section to store as the lower limit of the movement stroke the amount of displacement detected by the detecting means when a command for movement stroke lower limit storing processing is issued by the operation section, (ii) movement stroke calculating processing for obtaining the movement stroke of the movable member by subtracting the lower limit of the movement stroke stored in the storage section from the amount of displacement detected by the detecting means when a command for movement stroke calculating processing is issued by the operation section, (iii) starting point calculating storing processing for reading out from the storage section an effective measurement range corresponding to the movement stroke obtained by the movement stroke calculating processing, determining the starting point of the effective measurement range from such an effective measurement range, the movement stroke of the movable member, and the lower limit of the movement stroke stored in the storage section, and storing it in the storage section, and (iv) ending point calculating storing processing for obtaining the ending point of the effective measurement range from the starting point and the effective measurement range and storing it in the storage section.

With this arrangement, in the effective measurement range setting mode, when a command for movement stroke lower limit storing processing is issued by the operation section after the movable member is caused to move to the lower limit of the movement stroke, the amount of displacement (lower limit of movement stroke of the movable member) detected by the detecting means is stored in the storage section as the lower limit of the movement stroke. Then, when a command for movement stroke calculating processing is issued by the operation section after the movable member is caused to move to the upper limit of the movement stroke, the movement stroke of the movable member is obtained by subtracting the lower limit of the movement stroke stored in the storage section from the amount of displacement (upper limit of movement stroke of the movable member) detected by the detecting means.

Then, an effective measurement range corresponding to the obtained movement stroke is read out from the storage section, and the starting point of the effective measurement range is obtained from such an effective measurement range, the movement stroke of the movable member, and the lower limit of the movement stroke stored in the storage section, and is stored in the storage section. Also, the ending point of the effective measurement range is obtained from the starting point and the effective measurement range, and is stored in the storage section.

Accordingly, after the movable member is caused to move to the lower limit and the upper limit of the movement stroke, just issuing a command for movement stroke lower limit storing processing and movement stroke calculating processing through the operation section allows the starting point and the ending point of the effective measurement range to be automatically obtained. Namely, in this case, after the movable member is caused to move to the lower limit and the upper limit of the movement stroke, just issuing a command through the operation section allows setting of the starting point and ending point of the effective measurement range which is consistent from operator to operator.

DETAILED DESCRIPTION OF EMBODIMENTS

An exemplary embodiment according to the present invention is described below with reference to the attached drawings.

Figure 1:
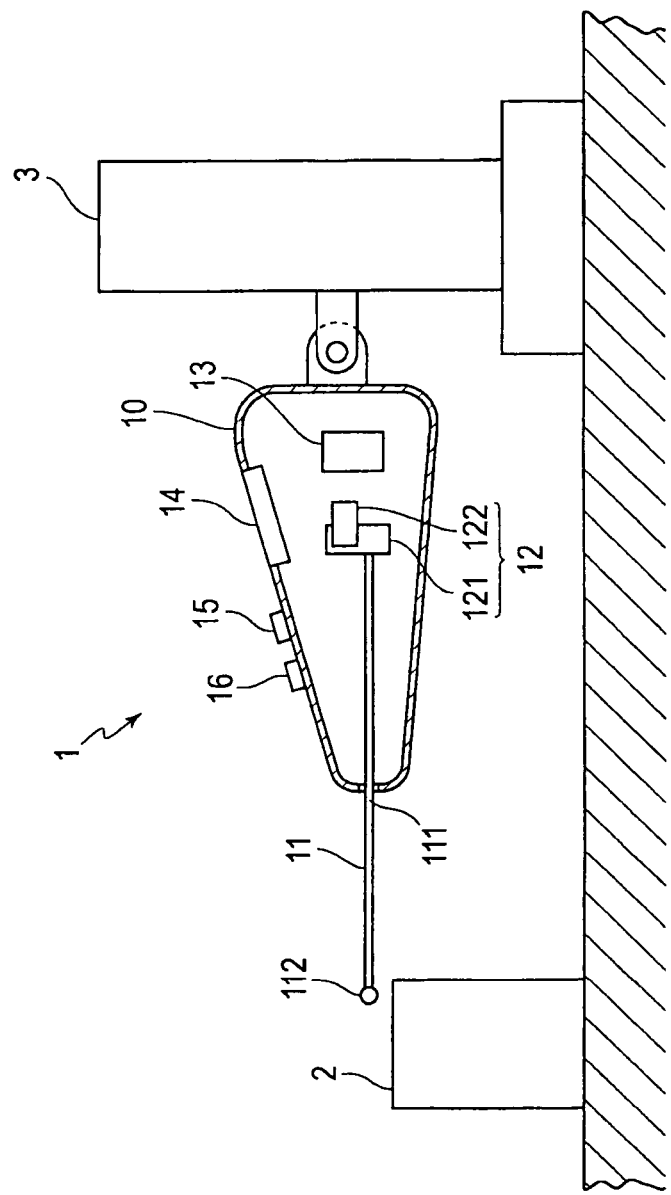
FIG. 1 is a cross-sectional view of a measuring instrument according to an embodiment of the invention.

FIG. 1 is a cross-sectional view of a measuring instrument according to a first embodiment.

As shown in FIG. 1, a test indicator 1 includes a main body 10 as a fixed member, a stylus 11 as a movable member swingably supported by the main body 10, an encoder 12 as detecting means (or detector) for detecting the amount of displacement of the stylus 11 relative to the main body 10, a calculating section 13 for calculating a measurement value from the amount of displacement detected by the encoder 12, of the stylus 11 relative to the main body 10, a display section 14 for displaying the measurement value obtained by the calculation of the calculating section 13, and an operation section 15 and a setting operation section 16 for issuing commands to the calculating section 13.

The main body 10 is a substantially rectangular enclosure having one end thereof secured to a stand 3 and having the other end supporting the stylus 11. The main body 10 has the display section 14 and the operating sections 15, 16 provided on the top surface thereof and the encoder 12 and the calculating section 13 provided inside of the main body 10.

The stylus 11 is supported so as to be swingable about a supported portion 111 that is provided so as to penetrate through the wall of the main body 10. The stylus 11 has a substantially spherical contact portion 112 provided at the one end thereof opposite to the main body 10, which is brought into contact with a measurement portion of an object 2 to be measured.

The encoder 12 has an electrode 121 provided at an end of the main body 10 and a detecting head 122 provided in the main body 10 and capacitively coupled to the electrode 121 for detection of the displacement of the stylus 11. An absolute position encoder is used which can detect the amount of displacement of the stylus 11 relative to the main body 10 in terms of absolute position.

Figure 9:
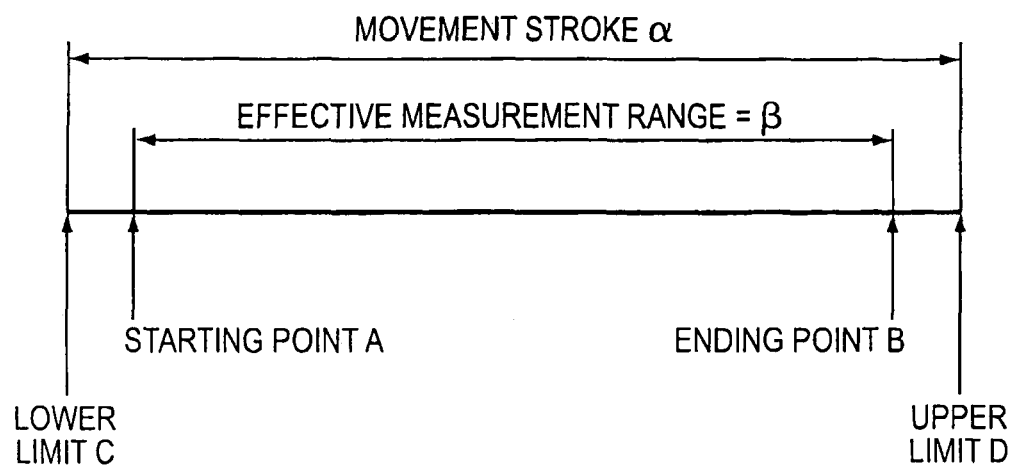
FIG. 9 is a diagram showing the relationship between the movement stroke of a movable member and an effective measurement range.

The operation section 15 includes a push button that issues a command to the calculating section 13 when an attempt is made to perform a measurement. The setting operation section 16 includes a push button that issues a command to the calculating section 13 when an attempt is made to set the effective measurement range, namely, to set the starting point A and the ending point B of the effective measurement range β as shown in FIG. 9. Since the setting operation section 16 is used, for example, when the test indicator 1 undergoes inspection for accuracy (before leaving the factory) or inspection for calibration, it may be incorporated into the main body 10 and need not necessarily include a push button.

Figure 2:
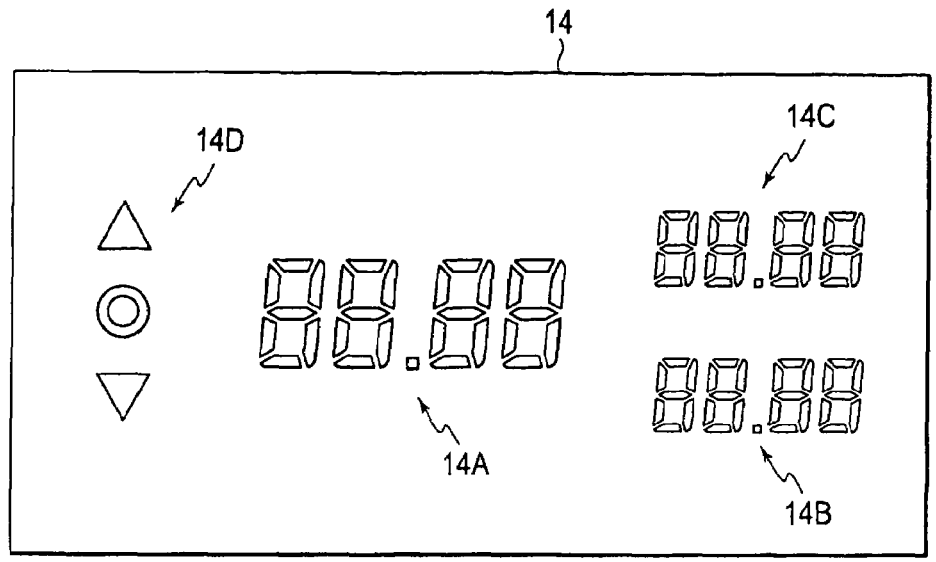
FIG. 2 is a diagram showing a display section of a measuring instrument according to an embodiment of the invention.

As shown in FIG. 2, the display section 14 is a liquid crystal display device for digitally displaying a measurement value calculated by the calculating section 13, and includes a measurement value indicating field 14A, an effective measurement range starting point indicating field 14B, an effective measurement range ending point indicating field 14C, and a determination result indicating field 14D. Each of the indicating fields 14A, 14B, 14C consists of 7-segment display elements. The determination result indicating field 14D includes an "o" field which indicates that a determination result is acceptable, a "∇" field which indicates that a determination result is not acceptable (the amount of displacement detected by the encoder 12 is less than the effective measurement range starting point), and a "Δ" field which indicates that a determination result is not acceptable (the amount of displacement detected by the encoder 12 is more than the effective measurement range ending point).

Figure 3:
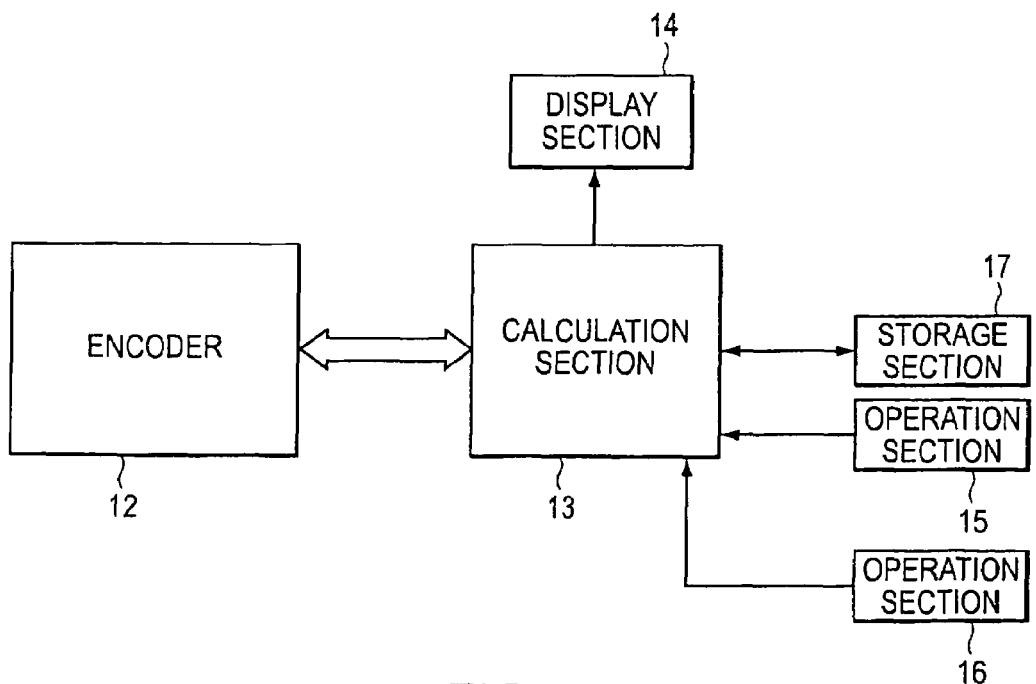
FIG. 3 is a diagram showing an inner structure of a measuring instrument according to an embodiment of the invention.

FIG. 3 shows an inner structure of the test indicator 1. As shown in FIG. 3, the encoder 12, the display section 14, the operation sections 15, 16, and a storage section 17 are connected to the calculating section 13. Calculating section 13 can be a processor that is programmed or hardwired (for example, it could be an ASIC) to perform the calculations and processes described herein.

The storage section 17 consists of, for example, a nonvolatile memory. Also, the storage section 17 stores the starting point A and the ending point B of the effective measurement range β that is larger than the lower limit C and smaller than the upper limit D of the movement stroke α of the stylus 11, in addition to the amount of displacement detected by the encoder 12.

In response to a command issued by the operation section 15, in the measuring mode the calculating section 13 causes the storage section 17 to store the position detected by the encoder 12 as a measurement reference position and performs measurement value calculating processing on the basis of the difference between a current position (current position of the stylus 11) and a measurement reference value stored in the storage section 17.

Also, the calculating section 13 determines whether or not the amount of displacement detected by the encoder 12 falls within the effective measurement range β stored in the storage section 17 and displays the determination result on the display section 14. Specifically, the amount of displacement detected by the encoder 12 is displayed in the measurement value indicating field 14A, and the starting point A and the ending point B of the effective measurement range β are displayed in the effective measurement range starting point indicating field 14B and the effective measurement range ending point indicating field 14C, respectively, and the result of the determination is displayed in the determination result indicating field 14D.

Furthermore, in the effective measurement range setting mode the calculating section 13 performs starting point storing processing for causing the storage section 17 to store as the starting point of the effective measurement range the amount of displacement detected by the encoder 12 when a command for storing a starting point is issued by the setting operation section 16 and performs ending point storing processing for causing the storage section 17 to store as the ending point of the effective measurement range the amount of displacement detected by the encoder 12 when a command for storing an ending point is issued by the setting operation section 16.

Figure 4:
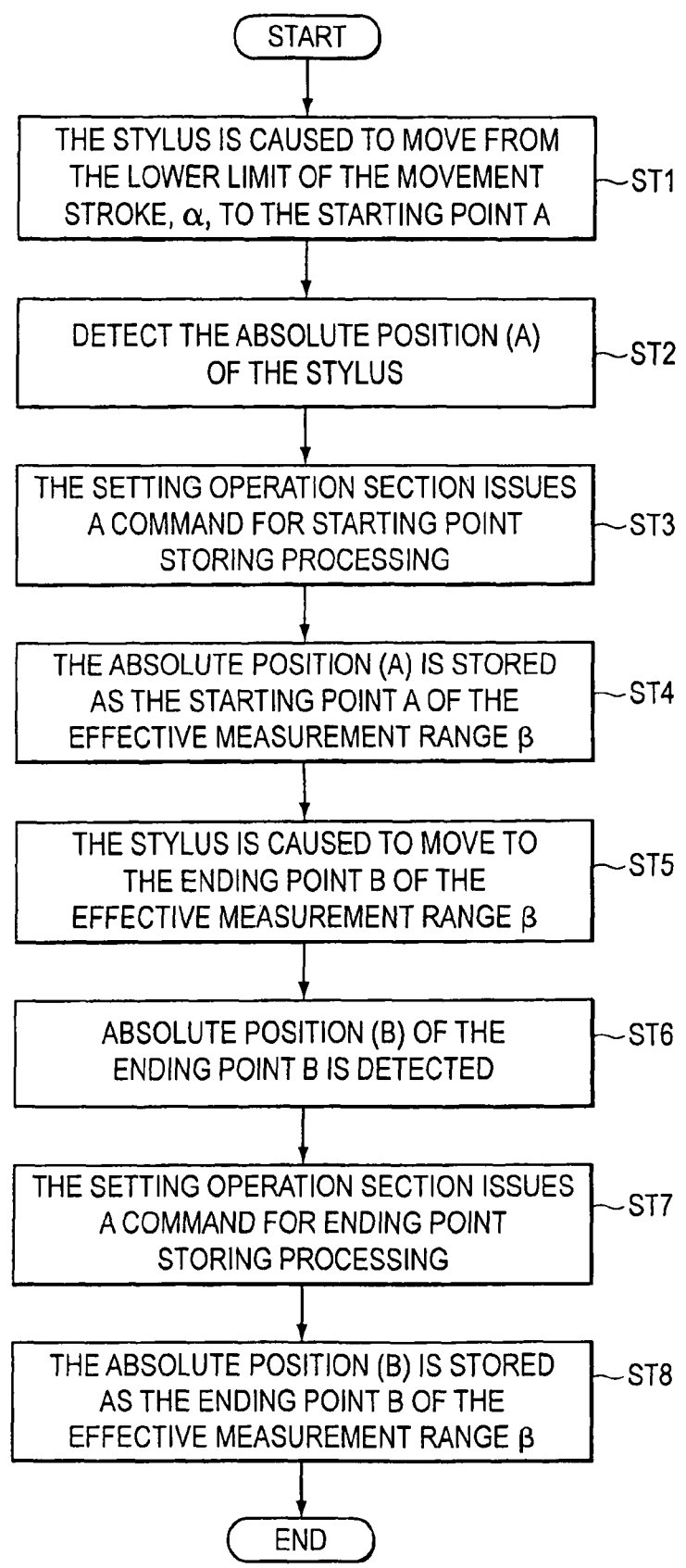
FIG. 4 is a flowchart illustrating setting processing for an effective measurement range of a measuring instrument according to an embodiment of the invention.

Setting of an effective measurement range is performed, for example, according to the steps (procedure) shown in FIG. 4.

ST1: The stylus 11 is caused to move from the lower limit C of the movement stroke α to a value (starting point A) greater than the lower limit C.

ST2: The encoder 12 detects the absolute position (A) of the starting point A of the stylus 11.

ST3: The setting operation section 16 is used to issue a command for starting point storing processing.

ST4: The absolute position (A) detected by the encoder 12 is stored in the storage section 17 as the starting point A of the effective measurement range β.

ST5: The stylus 11 is caused to move to the ending point B (lower than the upper limit D of the movement stroke of the stylus) of the effective measurement range β.

ST6: The encoder 12 detects the absolute position (B) of the ending point B of the stylus 11.

ST7: The setting operation section 16 is used to issue a command for ending point storing processing.

ST8: The absolute position (B) detected by the encoder 12 is stored in the storage section 17 as the ending point B of the effective measurement range β.

Accordingly, after the stylus 11 is caused to move to a desired position, just issuing a command for starting point storing processing or ending point storing processing through the setting operation section 16 allows the storage section 17 to store the starting point A and the ending point B of the effective measurement range β. In other words, just performing the same operation as the usual measurement operation allows the starting point A and the ending point B of the effective measurement range β to be stored.

Figure 5:
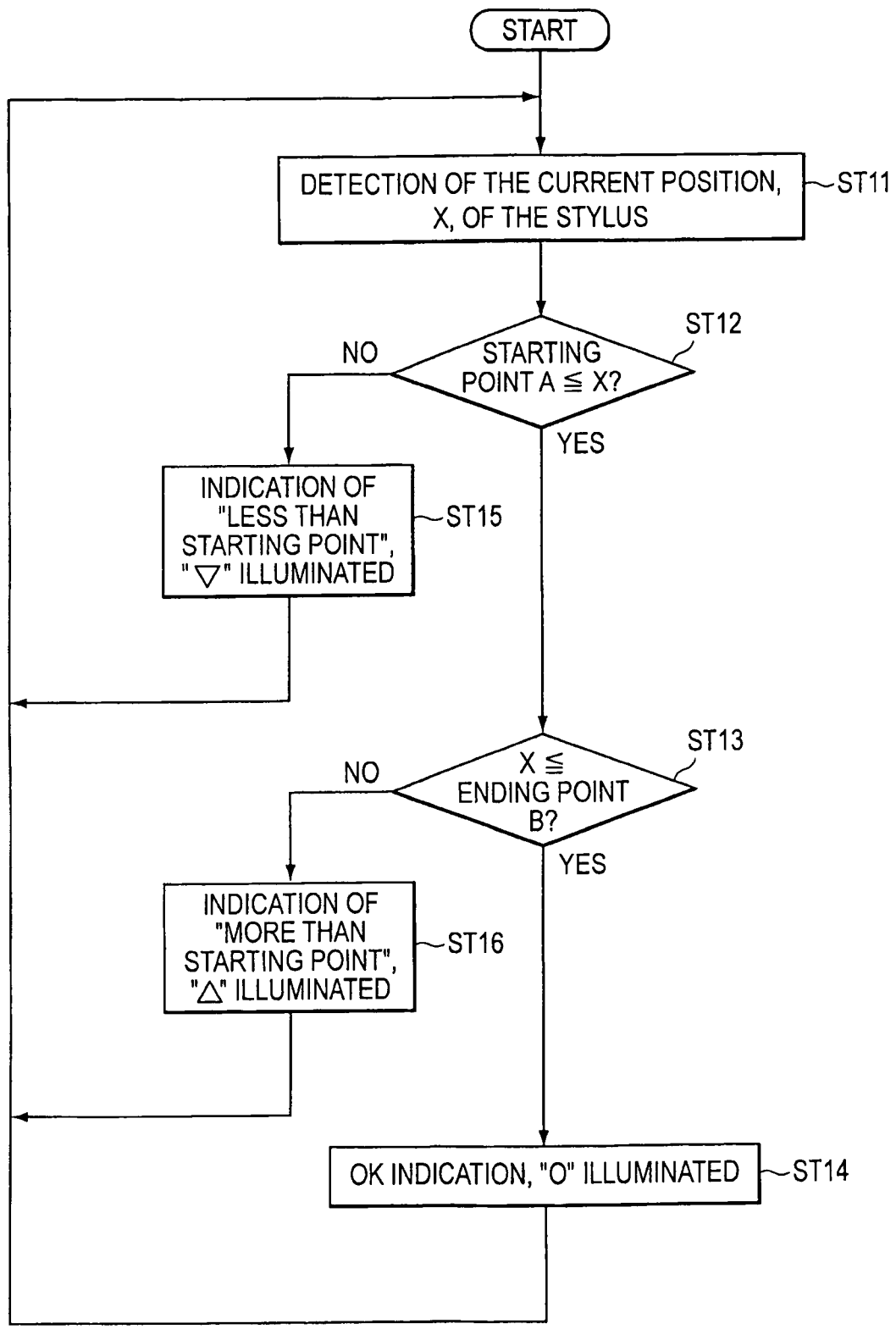
FIG. 5 is a flowchart illustrating measurement processing of a measuring instrument according to an embodiment of the invention.

Measurement processing is performed, for example, according to the steps in FIG. 5.

ST11: The encoder 12 detects the current position X of the stylus 11.

ST12: A determination is made as to whether or not the current position X is equal to or more than the starting point A.

ST13: If the current position X is found to be equal to or more than the starting point A, a determination is made as to whether or not the current position X is equal to or less than the ending point B.

ST14: If the current position X is equal to or less than the ending point B, the "o" field of the determination result indicating field 14D is illuminated.

ST15: If the determination in ST12 finds that the current position X is not equal to or more than the starting point A, namely, the current position X is less than the starting point A, the "∇" field of the determination result indicating field 14D is illuminated.

ST16: If the determination in ST13 finds that the current position X is not equal to or less than the ending point B, namely, the current position X is more than the ending point B, the "Δ" field of the determination result indicating field 14D is illuminated.

Accordingly, a determination as to whether or not measurement is made within the effective measurement range β of the stylus 11 is displayed, thereby preventing degradation in reliability of measurement values. In addition, there is no need to narrow the effective measurement range to maintain measurement accuracy in setting of the test indicator 1 to an object to be measured, as is always the case with the known measuring instrument, leading to enhanced convenience as well as achieving the maximization of the effective measurement range.

Furthermore, the display section 14 displays not only the result of a determination as to whether or not the amount of displacement detected by the encoder 12 falls within the effective measurement range β, but also measurement values and the starting point A and the ending point B of the effective measurement range stored in the storage section 17, helping to identify a region within the effective measurement range β where measurement values are distributed.

The present invention is not limited to the foregoing embodiment. The following modifications are within the scope of the present invention.

In the foregoing embodiment, setting of the effective measurement range β is performed, for example, according to the steps as shown in FIG. 4, but the invention is not limited to the steps depicted in FIG. 4.

Figure 6:
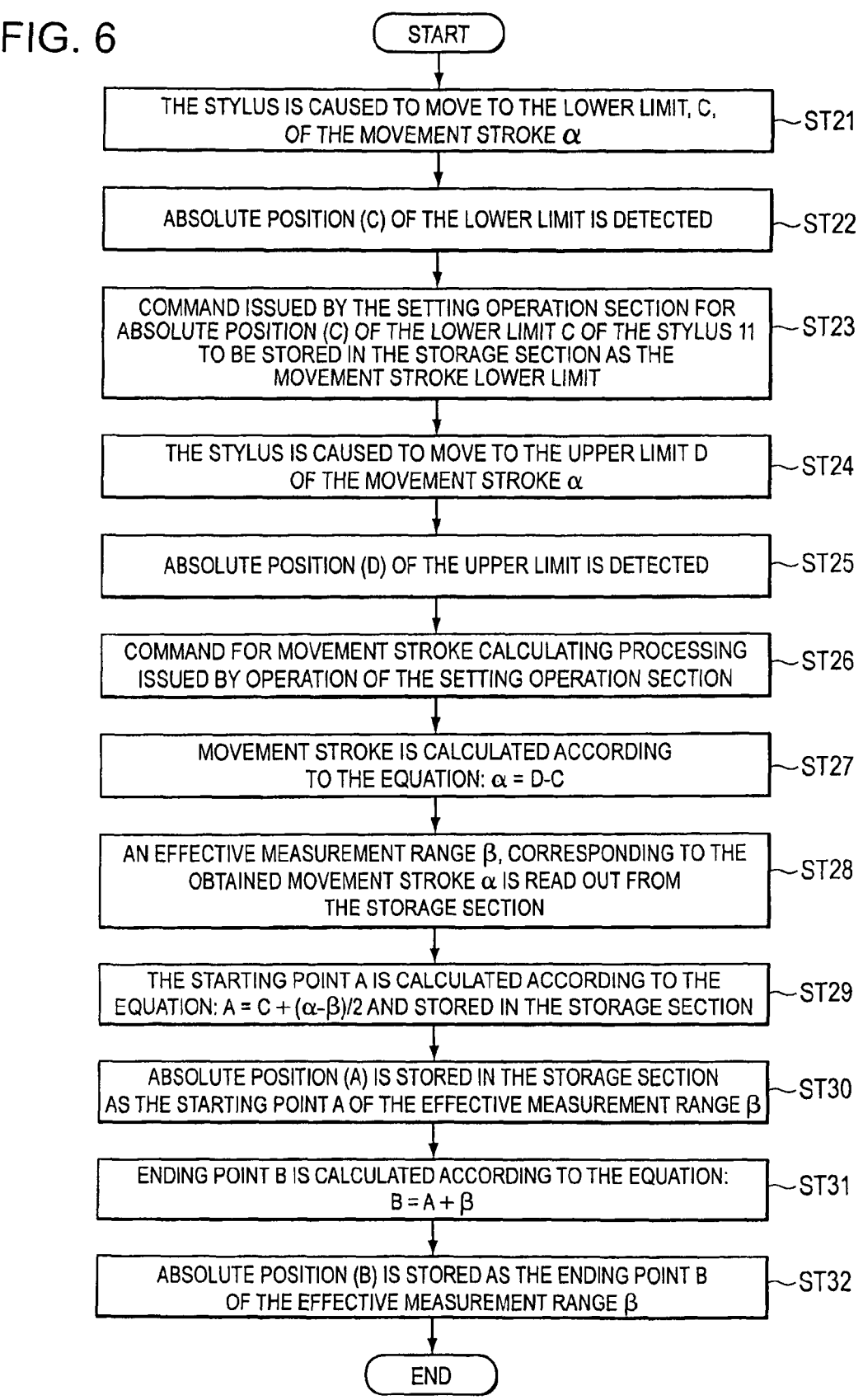
FIG. 6 is a flowchart illustrating setting processing for an effective measurement range of a measuring instrument according to an embodiment of the invention.

For example, steps described in FIG. 6 may be taken for that purpose. In these steps, an effective measurement range β corresponding to the movement stroke α of the stylus 11 is stored in the storage section 17. The calculating section 13 performs the following processing in the effective measurement range setting mode:

Movement stroke lower limit storing processing: When a command for movement stroke lower limit storing processing is issued by the setting operation section 16, the storage section 17 is caused to store the amount of displacement detected by the encoder 12 as a movement stroke lower limit C.

Movement stroke calculating processing: When a command for movement stroke calculating processing is issued by the setting operation section 16, the movement stroke α of the stylus 11 is obtained by subtracting a movement stroke lower limit stored in the storage section 17 from the amount of displacement detected by the encoder 12.

Starting point calculating storing processing: An effective measurement range β corresponding to the movement stroke α obtained by the movement stroke calculating processing is read out from the storage section 17, and the starting point A of the effective measurement range β is determined from the effective measurement range β, the movement stroke α of the stylus 11, and the movement stroke lower limit C stored in storage section 17. The starting point is calculated according to the equation: $A=C+(\alpha-\beta)/2$.

Ending point calculating storing processing: The ending point B of the effective measurement range β is determined from the starting point A and the effective measurement range β. The ending point is calculated according to the equation: $B=A+\beta$.

The steps as shown in FIG. 6, for example, are followed in the effective measurement range setting mode.

ST21: The stylus 11 is caused to move to the lower limit C of the movement stroke α.

ST22: The absolute position (C) of the lower limit C of the stylus 11 is detected by the encoder 12.

ST23: A command for movement stroke lower limit storing processing is issued by the operation of the setting operation section 16. This causes the absolute position (C) of the lower limit C of the stylus 11 detected by the encoder 12 to be stored in the storage section 17 as the movement stroke lower limit.

ST24: The stylus 11 is caused to move to the upper limit D of the movement stroke α.

ST25: The absolute position (D) of the upper limit D of the stylus 11 is detected by the encoder 12.

ST26: A command for movement stroke calculating processing is issued by the operation of the setting operation section 16.

ST27: The movement stroke α of the stylus 11 is obtained by subtracting the movement stroke lower limit C stored in the storage section 17 from the absolute position D of the upper limit D of the stylus 11 detected by the encoder 12.

ST28: An effective measurement range β corresponding to the obtained movement stroke α is read out from the storage section 17.

ST29: The starting point A of the effective measurement range is obtained from the effective measurement range β, the movement stroke α of the stylus 11, and the movement stroke lower limit C stored in storage section 17. Namely, $A=C+(\alpha-\beta)/2$.

ST30: The obtained absolute position (A) is stored in the storage section 17 as the starting point A of the effective measurement range β.

ST31: The ending point B of the effective measurement range β is determined from the starting point A and the effective measurement range β according to the equation: $B=A+\beta$.

ST32: Absolute position B is stored in the storage section 17 as the ending point B of the effective measurement range β.

Accordingly, after the stylus 11 is caused to move to the lower limit and the upper limit of the movement stroke, just issuing a command for performing the movement stroke lower limit storing processing or the movement stroke calculating processing using the setting operation section 16 allows the starting point A and the ending point B of the effective measurement range β to be automatically determined and stored in the storage section 17. Namely, in this case, after the stylus 11 is caused to move to the lower limit C and the upper limit D of the movement stroke α, just issuing a command through the setting operation section 16 allows setting of the starting point A and the ending point B of the effective measurement range which is consistent from operator to operator.

In the foregoing embodiment, the display section 14, for example, has a configuration as shown in FIG. 2, but the invention is not limited to the display section depicted in FIG. 2.

Figure 7:
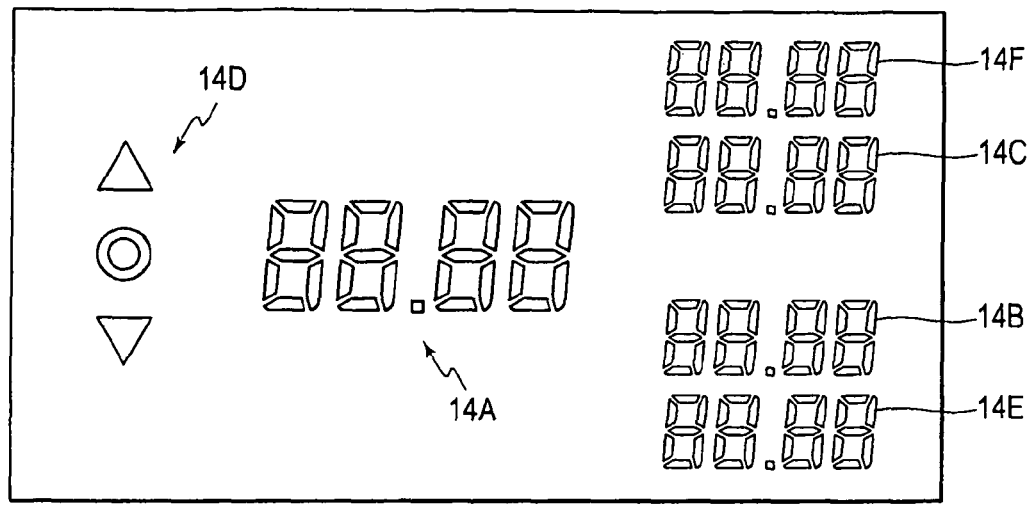
FIG. 7 is a view showing a display section of a measuring instrument according to an embodiment of the invention.

For example, as shown in FIG. 7, a movement stroke lower limit indicating field 14E and a movement stroke upper limit indicating field 14F may be added to the display section 14 to indicate the lower limit C and the upper limit D of the movement stroke α, respectively.

In this case; the movement stroke lower limit C and upper limit D of the stylus 11 are stored in advance in the storage section 17. The display section 14 displays measurement values, the starting point A and the ending point B of the effective measurement range β stored in the storage section 17, and the movement stroke lower limit C and upper limit D of the stylus 11.

With this arrangement, the lower limit C and upper limit D of the movement stroke α of the stylus 11 displayed on the display section 14 helps to identify how far a measurement value is from the lower limit C and upper limit D of the movement stroke α of the stylus 11.

In the foregoing embodiment, measurement values, the starting point A and the ending point B of the effective measurement range β, and the lower limit C and upper limit D of the movement stroke are digitally displayed, but the display is not limited to being digital.

Figure 8:
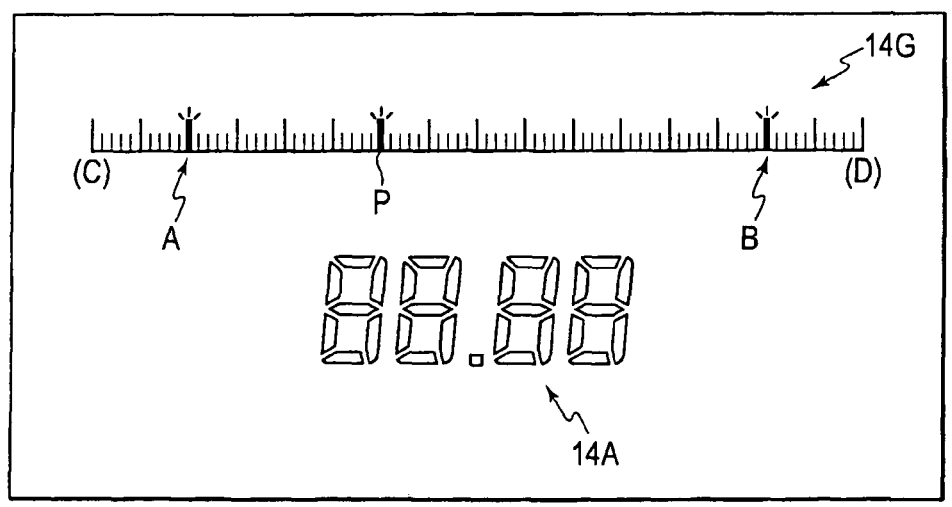
FIG. 8 is a view showing a display section of a measuring instrument according to an embodiment of the invention.

For example, as shown in FIG. 8, an analog indicating field 14G where a plurality of display elements are arranged at predetermined pitches is provided, and the starting point A and the ending point B of the effective measurement range β (in addition to this, the lower limit C and upper limit D of the movement stroke α) as well as a measurement value P may be indicated by illumination of the display elements.

The measuring instrument according to the present invention is not limited to the test indicator 1 described in the foregoing embodiments. For example, the invention is applicable to vernier calipers, micrometers, indicators, height gauges and the like. The present invention can be applied to these measuring instruments. This also produces substantially the same effect as the foregoing embodiment.

The detecting means is not limited to the capacitive type encoder 12 as described in the foregoing embodiment. Any means may be used as the detecting means if it can detect the amount of displacement of a moving member (stylus 11) relative to a fixed member (main body 10). For example, an inductive-type or optical-type encoder may be used.

The display section 14 is not limited to the liquid crystal display device as described in the foregoing embodiment. Any display device may be used if it can display measurement values calculated by the calculating section. For example, a display device employing an organic or inorganic electroluminescence may be used.

One section may be substituted for both operation sections 15 and 16. For example, depressing time of a button may be used to switch such a section between settings.

The present invention can be applied to a measuring instrument for measuring the amount of displacement of a moving member relative to a fixed member.

The above described embodiments are examples, and various modifications can be made without departing from the spirit and scope of the invention.

What is claimed is:

1. A measuring instrument comprising:
   a fixed member;
   a movable member configured to be movable in relation to the fixed member, the movable member being movable over a movement stroke that is a complete distance over which the movable member is capable of moving;
   detecting means for detecting an amount of displacement of the movable member relative to the fixed member;
   a calculating section that calculates a measurement value from the amount of displacement detected by the detecting means;
   a display section that displays the measurement value calculated by the calculating section; and
   an operation section that issues a command to the calculating section, wherein
   a storage section stores an effective measurement range whose value are larger than a lower limit and smaller than an upper limit of the movement stroke of the movable member, the effective measurement range representing a maximum distance over which the measuring instrument can accurately make a measurement, and
   the calculating section determines whether or not the amount of displacement detected by the detecting means falls within the effective measurement range stored in the storage section and displays a result of the determination on the display section.

2. The measuring instrument according to claim 1, wherein the calculating section displays on the display section the measurement value and a starting point and an ending point of the effective measurement range stored in the storage section.

3. The measuring instrument according to claim 2, wherein in an effective measurement range setting mode, the calculating section (i) performs starting point storing processing causing the storage section to store as a starting point of the effective measurement range the amount of displacement detected by the detecting means when a command for starting point storing processing is issued by the operation section, and (ii) performs ending point storing processing causing the storage section to store as an ending point of the effective measurement range the amount of displacement detected by the detecting means when a command for ending point storing processing is issued by the operation section.

4. The measuring instrument according to claim 2, wherein:
   the storage section has an effective measurement range corresponding to the movement stroke of the movable member stored therein in advance,
   in an effective measurement range setting mode, the calculating section performs:
   (i) movement stroke lower limit storing processing causing the storage section to store as the lower limit of the movement stroke, the amount of displacement detected by the detecting means, when a command for movement stroke lower limit storing processing is issued by the operation section,
   (ii) movement stroke calculating processing obtaining the movement stroke of the movable member by subtracting the lower limit of the movement stroke stored in the storage section from the amount of displacement detected by the detecting means when a command for movement stroke calculating processing is issued by the operation section,
   (iii) starting point calculating processing of the effective measurement range by reading out from the storage section an effective measurement range corresponding to the movement stroke obtained by the movement stroke calculating processing, determining the starting point of the effective measurement range based on the effective measurement range, the movement stroke of the movable member, and the lower limit of the movement stroke stored in the storage section, and storing the starting point of the effective measurement range in the storage section, and (iv) ending point calculating storing processing for obtaining the ending point of the effective measurement range from the starting point and the effective measurement range and storing the ending point in the storage section.

5. The measuring instrument according to claim 1, wherein the storage section stores the lower limit and the upper limit of the movement stroke of the movable member, and the calculating section displays on the display section the measurement value, a starting point and an ending point of the effective measurement range stored in the storage section, and the lower limit and the upper limit of the movement stroke of the movable member.

6. The measuring instrument according to claim 5, wherein in an effective measurement range setting mode, the calculating section (i) performs starting point storing processing causing the storage section to store as a starting point of the effective measurement range the amount of displacement detected by the detecting means when a command for starting point storing processing is issued by the operation section, and (ii) performs ending point storing processing causing the storage section to store as an ending point of the effective measurement range the amount of displacement detected by the detecting means when a command for ending point storing processing is issued by the operation section.

7. The measuring instrument according to claim 5, wherein:

the storage section has an effective measurement range corresponding to the movement stroke of the movable member stored therein in advance, in an effective measurement range setting mode, the calculating section performs:

(i) movement stroke lower limit storing processing causing the storage section to store as the lower limit of the movement stroke, the amount of displacement detected by the detecting means, when a command for movement stroke lower limit storing processing is issued by the operation section, (ii) movement stroke calculating processing obtaining the movement stroke of the movable member by subtracting the lower limit of the movement stroke stored in the storage section from the amount of displacement detected by the detecting means when a command for movement stroke calculating processing is issued by the operation section, (iii) starting point calculating processing of the effective measurement range by reading out from the storage section an effective measurement range corresponding to the movement stroke obtained by the movement stroke calculating processing, determining the starting point of the effective measurement range based on the effective measurement range, the movement stroke of the movable member, and the lower limit of the movement stroke stored in the storage section, and storing the starting point of the effective measurement range in the storage section, and (iv) ending point calculating storing processing for obtaining the ending point of the effective measurement range from the starting point and the effective measurement range and storing the ending point in the storage section.

8. The measuring instrument according to claim 1, wherein in an effective measurement range setting mode, the calculating section (i) performs starting point storing processing causing the storage section to store as a starting point of the effective measurement range the amount of displacement detected by the detecting means when a command for starting point storing processing is issued by the operation section, and (ii) performs ending point storing processing causing the storage section to store as an ending point of the effective measurement range the amount of displacement detected by the detecting means when a command for ending point storing processing is issued by the operation section.

9. The measuring instrument according to claim 1, wherein:

the storage section has an effective measurement range corresponding to the movement stroke of the movable member stored therein in advance, in an effective measurement range setting mode, the calculating section performs:

(i) movement stroke lower limit storing processing causing the storage section to store as the lower limit of the movement stroke, the amount of displacement detected by the detecting means, when a command for movement stroke lower limit storing processing is issued by the operation section, (ii) movement stroke calculating processing obtaining the movement stroke of the movable member by subtracting the lower limit of the movement stroke stored in the storage section from the amount of displacement detected by the detecting means when a command for movement stroke calculating processing is issued by the operation section, (iii) starting point calculating processing of the effective measurement range by reading out from the storage section an effective measurement range corresponding to the movement stroke obtained by the movement stroke calculating processing, determining the starting point of the effective measurement range based on the effective measurement range, the movement stroke of the movable member, and the lower limit of the movement stroke stored in the storage section, and storing the starting point of the effective measurement range in the storage section, and (iv) ending point calculating storing processing for obtaining the ending point of the effective measurement range from the starting point and the effective measurement range and storing the ending point in the storage section.

10. The measuring instrument according to claim 1, wherein the operation section includes a push-button.

11. The measuring instrument according to claim 1, wherein the detecting means is an encoder.

12. The measuring instrument according to claim 1, wherein the display section is a digital display.

13. The measuring instrument according to claim 1, wherein the display section is an analog display.

14. A measuring instrument comprising:
a fixed member;
a movable member configured to be movable in relation to the fixed member, the movable member being movable over a movement stroke that is a complete distance over which the movable member is capable of moving;
a detector that detects an amount of displacement of the movable member relative to the fixed member;
a processor that calculates a measurement value from the amount of displacement detected by the detector;
a display that displays the measurement value calculated by the processor; and a controller that issues a command to the processor; and
a memory that stores an effective measurement range whose values are larger than a lower limit and smaller than an upper limit of the movement stroke of the movable member, the effective measurement range representing a maximum distance over which the measuring instrument can accurately make a measurement,
wherein the processor determines whether or not the amount of displacement detected by the detector falls within the effective measurement range stored in the memory and displays the result on the display.

* * * * *